April 14, 1959     I. M. LE BARON     2,882,127
GRANULAR DICALCIUM PHOSPHATE PRODUCT AND
METHOD FOR THE PRODUCTION THEREOF
Filed May 14, 1958
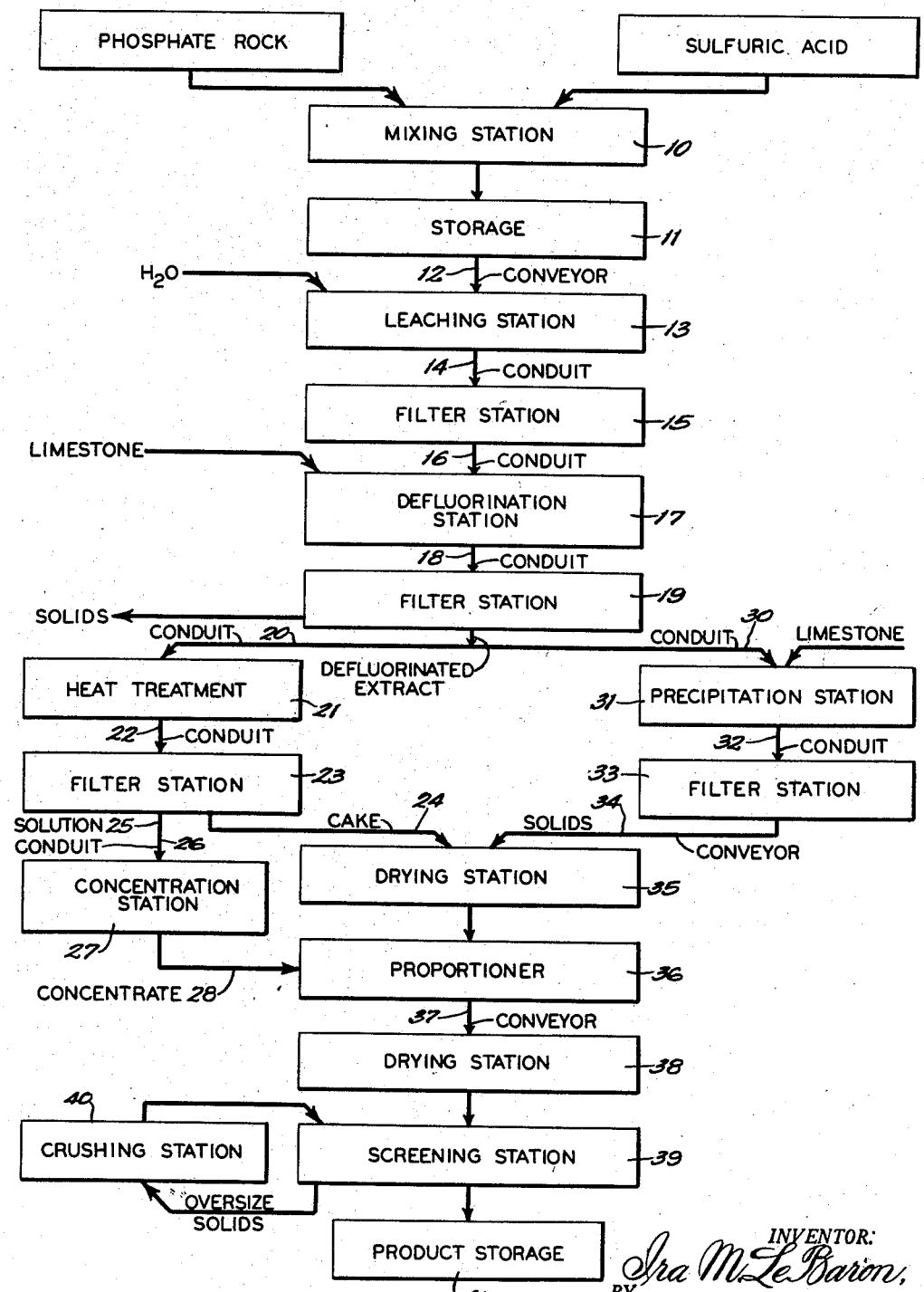
INVENTOR:
Ira M. LeBaron,
BY Ernest V. Haines
ATTORNEY United States Patent Office 2,882,127
Patented Apr. 14, 1959

2,882,127

GRANULAR DICALCIUM PHOSPHATE PRODUCT AND METHOD FOR THE PRODUCTION THEREOF

Ira M. Le Baron, Evanston, Ill., assignor to International Minerals & Chemical Corporation, a corporation of New York Application May 14, 1958, Serial No. 736,948

21 Claims. (Cl. 23—109)

This invention relates to the preparation of agglomerated phosphates. More particularly, it relates to a method of treating animal feed grade powdered dicalcium phosphate to eliminate dusting.

Animal food supplement material, e.i., dicalcium phosphate, is precipitated from defluorinated phosphate solution by reaction with lime or calcium carbonate. This dicalcium phosphate material precipitates as fine small crystals which with any attrition during drying are reduced to a low bulk density powder, most of whose particles are of less than 100 mesh particle size. This low bulk density powder or dust presents a serious handling problem both in the manufacturing plant or in an animal food processing plant.

It is a primary object of this invention to overcome the disadvantages and shortcomings of animal food supplement phosphate products heretofore manufactured.

It is another object of this invention to provide a granular animal food grade dicalcium phosphate.

It is still another object of this invention to provide a product containing both water soluble and citrate soluble calcium phosphate components which is nondusting.

It is an additional object of the invention to provide a method of treating dicalcium phosphate with acidic solutions to produce a dense agglomerated, predominantly dicalcium phosphate material.

It is a further object of this invention to provide a method of treating dicalcium phosphate with acidic phosphatic solutions to produce a dense agglomerated, predominantly dicalcium phosphate material.

These and other objects will be apparent to those skilled in the art from the following description.

The granular dicalcium phosphate product of this invention is a substantially nonhygroscopic agglomerate of a plurality of particles of dicalcium phosphate, said particles being substantially enveloped in and bonded together with a matrix containing as a bonding agent monocalcium phosphate, the calcium oxide to phosphorus pentoxide mol ratio of the mono- and dicalcium phosphate materials in said agglomerate being within the range of about 1.55:1.0 to about 1.95:1.0, said monocalcium phosphate comprising a minor proportion of the product.

In accordance with specific embodiments of the invention this granular product, inter alia, may be prepared by reacting dicalcium phosphate with a water solution of phosphatic material, with an aqueous solution of a free acid or with an aqueous solution of an acid salt capable of forming hydrogen ions in solution to suitably react with dicalcium phosphate and form monocalcium phosphate. In any case, however, the reaction is conducted to produce a product characterized by a calcium oxide to phosphorus pentoxide mol ratio of between about 1.55:1.0 and about 1.95:1.0 and preferably a calcium oxide to phosphorus pentoxide mol ratio of between about 1.75:1.0 and about 1.9:1.0.

In the production of the granular agglomerates of the invention, the ratio of dicalcium phosphate to monocalcium phosphate must be maintained within specific limits. Too small a quantity of phosphatic binder is almost as ineffective to agglomeration of dicalcium phosphate as is water. Water produces agglomerates in the wet form, but upon drying, the agglomerates dust off and break down to the original small grain particles under the normal handling and shipping conditions. On the other hand, if too large a quantity of aqueous phosphatic solution is added the agglomerates will, in addition to coating the dicalcium phosphate with binder, become exteriorly coated wtih hygroscopic monocalcium phosphate and present a handling problem of an entirely different nature, i.e., hygroscopicity of products. Dusting and hygroscopicity are avoided and proper cohesive characteristics are obtained within the critical mol ratios of calcium oxide to phosphorus pentoxide, as above set forth.

A. REACTION OF DICALCIUM PHOSPHATE WITH AQUEOUS SOLUTIONS OF CALCIUM PHOSPHATE

This embodiment of the invention contemplates mixing and reacting fine particle size dicalcium phosphate material whose particle size is generally less than 100 mesh and is characterized by a calcium oxide to phosphorus pentoxide mol ratio in the range of between about 2.0:1.0 and about 2.3:1.0, with an aqueous monocalcium phosphase solution, preferably a fluorine-free, predominantly monocalcium phosphate solution, the $CaO/P_2O_5$ mol ratio of which is between about 0.20:1.0 and about 1.0:1.0. These reactants are commingled in proportions to produce a $CaO/P_2O_5$ mol ratio in the final product in the range of about 1.55:1.0 and about 1.95:1.0, and are agitated to effect an intimate mixing. This reacted mixture is then dried, for example, in a rotary kiln, at temperatures in the range of about 90° C. to about 120° C.

Monocalcium phosphate has the formula $CaH_4(PO_4)_2$ and corresponds to a $CaO/P_2O_5$ mol ratio of 1.0:1.0. Predominantly monocalcium phosphate solutions have a $CaO/P_2O_5$ mol ratio of less than 1.0:1.0. In the leaching of superphosphates, for example, aqueous solutions are obtained consisting predominantly of monocalcium phosphate and having a $CaO/P_2O_5$ mol ratio generally in the range of from about 0.25:1.0 to about 0.7:1.0.

Predominantly monocalcium phosphate solutions react with dicalcium phosphate in the presence of some moisture. Accordingly, if the commingling or mixing is sufficiently thorough, the phosphatic solutions may be admixed with wet dicalcium phosphate such as the form in which it is removed from the filters after precipitation of dicalcium phosphate from monocalcium phosphate solutions. Preferably, however, the phosphatic solutions are mixed with water-wetted dicalcium phosphate since this apparently results in a more complete reaction.

The following examples are given as illustrative of the reaction of dicalcium phosphate with aqueous solutions of water soluble calcium phosphate to produce the granular agglomerate of the present invention. However, the invention is not to be construed as limited to as specific details as therein set forth.

*Example I*

About 60 tons per hour of Florida phosphate rock are ground to a particle size, approximately 52% of which passed through a 200 mesh standard screen. This rock analyzed about 68% bone phosphate of lime. The ground rock was mixed with about 36 tons per hour of 98% sulfuric acid added as approximately 53° Bé. aqueous solution. The mixture was thoroughly agitated for about one minute, after which it was discharged onto a continuous belt provided with exhaust means for gases such as sulfur dioxide, silicon tetrafluoride, and the like, adjacent the point of discharge of slurry onto the belt. The belt length and its speed were such that the mix remained on the belt approximately 20 minutes. The discharge from the belt was stored in a pile for about 30 days.

The stored material was then removed from storage, broken up, and sufficient water added to give a slurry of about 35% undissolved solids. The slurry was subjected to four stages of continuous countercurrent leaching and filtering, the final filtrate being a leached solution containing about 30% dissolved solids and being of approximately 32° Bé. gravity. The discarded tailings contained about 2.5% of the 30% total $P_2O_5$ in the original rock. The filtrate from the leaching operation was further processed by adding approximately 4.7 tons per hour of limestone or its equivalent in calcium hydroxide added in the form of hydrated lime or other suitable calcium oxide source material. After slurrying for approximately 30 minutes, the slurry was filtered on a drum filter to remove precipitated solids such as calcium fluoride, aluminum phosphate, iron phosphate, as well as any unreacted limestone.

The filtrate from the slurrying or defluorination step analyzed as follows:

| | Parts by weight |
|---|---|
| $P_2O_5$ | 100 |
| Fluorine | 0.2 |
| CaO | 37.5 |
| Solids | 160 |
| Water | 750 |
| Total | 910 |

The defluorinated extract totaling approximately 136 tons per hour was split into two streams having a ratio of 80% to 20% by weight.

On a parts by weight basis comparable to the analysis of the feed being delivered to the dicalcium phosphate precipitation, the minor portion split from the main stream corresponds to the feed as follows:

| | Parts by weight |
|---|---|
| $P_2O_5$ | 26.6 |
| CaO | 10 |
| Solids | 42.6 |
| Water | 200 |
| Total | 242.6 |

This portion of the solution was heated to boiling, i.e., about 215° F., and held at that temperature for about 10 minutes. A precipitate was formed upon heating and was recovered by filtration. These solids analyzing:

| | Parts by weight |
|---|---|
| $P_2O_5$ | 6.6 |
| CaO | 5.2 |
| Solids | 13.2 |
| Water | 3.3 |
| Total | 16.5 | were mixed with the dicalcium phosphate being dried in the Nichols-Herreschoff hearth furnace.

Hot filtrate from the heating and filtering operation analyzed as follows:

| | Parts by weight |
|---|---|
| $P_2O_5$ | 20 |
| CaO | 4.8 |
| Solids | 29.4 |
| Water | 197 |
| Total | 226.4 |

This hot filtrate was then concentrated by evaporation which removed 163 parts by weight of water leaving a concentrated solution which analyzed as follows:

| | Parts by weight |
|---|---|
| $P_2O_5$ | 20 |
| CaO | 4.8 |
| Solids | 29.4 |
| Water | 34.1 |
| Total | 63.5 |

The major portion of the defluorinated extract, totaling approximately 110 tons per hour of defluorinated reactor, was treated with approximately 11.3 tons per hour of calcium carbonate, i.e., Ocala limestone, to precipitate dicalcium phosphate. The resultant slurry was filtered and the solids dried in a Nichols-Herreschoff multiple hearth furnace at a temperature of about 110° C. This filtered dicalcium phosphate was mixed with the precipitated solids filtered from the heat treated portion of the extract.

Dry dicalcium phosphate received from the Nichols-Herreschoff dryer analyzed as follows:

| | Parts by weight |
|---|---|
| $P_2O_5$ | 80 |
| CaO | 69 |
| Solids | 170 |
| Water | --- |
| Total | 170 |

This dry product was mixed with the above described concentrate in a pug mill in proportions to give a mixture analyzing as follows:

| | Parts by weight |
|---|---|
| $P_2O_5$ | 100 |
| CaO | 73.7 |
| Solids | 200 |
| Water | 34 |
| Total | 234 |

This mixture was dried in a rotary dryer at 100° C. The dry product was screened on a 20 mesh size standard screen. Over size material was crushed and the crushed material returned to the screen. The −20 mesh +80 mesh size particles were recovered as product and analyzed as follows:

| | Parts by weight |
|---|---|
| $P_2O_5$ | 100 |
| CaO | 73.7 |
| Solids | 200 |
| Water | --- |
| Total | 200 |

The original dry dicalcium phosphate material delivered by the Nichols-Herreschoff dryer was of a particle size such that approximately 100% would pass through an 80 mesh size standard screen. The final product has a CaO/$P_2O_5$ mol ratio of approximately 1.87.

*Example II*

Predetermined equal quantities of the above described dry dicalcium phosphate material, i.e., 150 grams, were each mixed with quantities of the above described concentrate solution so as to produce mixtures containing 21%, 25%, 28%, and 31%, respectively, of the total $P_2O_5$ content of the mixture as monocalcium phosphate binder. Each sample was dried in an oven at a temperature of approximately 110° C. for approximately two hours. A 150 gram portion of each sample was then removed from the oven and placed in a bag within a six inch diameter ball mill and the mill rotated for approximately ten minutes. Each sample was then removed from its grinding mill and the product screened on an 80 mesh size standard screen to determine the quantity of fines produced. Results were as follows:

| Percent P₂O₅ as Mono-Calcium Phosphate Binder | Percent of Product Passing Through 80 Mesh Screen |
|---|---|
| 21 | 13 |
| 25 | 8 |
| 28 | 6 |
| 31 | 3 |

The process of manufacture of the above described agglomerated dicalcium phosphate product is illustrated by the schematic flow sheet in which phosphate rock and sulfuric acid are reacted at mixing station 10. The acid-rock mix is aged in storage bin 11. Acid-rock mix is removed from storage and delivered by conveyor 12 to leaching station 13. At leaching station 13 the acid-rock mix solids are countercurrently contacted with water or dilute aqueous solution. The resultant slurry from leaching station 13 is conveyed by conduit 14 to filter station 15 where solids are separated from aqueous solution.

Aqueous solution is conveyed by conduit 16 to defluorination station 17 where it is mixed with a predetermined quantity of limestone delivered from a storage source not shown. Slurry from defluorination station 17 is pumped through conduit 18 to filter station 19. Defluorinated extract is split into two portions, a major portion and a minor portion. The minor portion of extract is delivered through conduit 20 to a heat treatment station 21. Heat treated solution and precipitated solids are delivered from station 21 to filter station 23 through conduit 22. At filter station 23 there is produced a cake 24 and a solution 25. Solution 25 is conveyed through conduit 26 to concentration station 27 where water is removed and a concentrate 28 is obtained.

The major portion of extract is delivered through conduit 30 to a precipitation station 31 where it is mixed with additional quantities of limestone delivered from a source not shown. Limestone reacts with the extract in reaction station 31 to precipitate dicalcium phosphate. Slurry from reaction station 31 is conveyed through conduit 32 to filter station 33. Wet solids segregated at filter station 33 are commingled with cake 24 and moved on conveyor 34 to drying station 35. Dry solids from station 35 are mixed with concentrate 28 in proportioner 36 and moved by conveyor 37 to drying station 38. Dry solids issuing from drying station 38 are sized at screening station 39. Oversize material is conveyed to crushing station 40 from whence it is returned to screening station 39. The undersize or minus 20 plus 35 particle size material is the product conveyed to storage 41.

B. REACTION OF DICALCIUM PHOSPHATE WITH AQUEOUS SOLUTION OF A FREE ACID

In accordance with this embodiment of the invention feed grade dicalcium phosphate is reacted with aqueous, predominantly acid, solutions, the proportions of reactants being such as to produce a granular agglomerate mass having a $CaO/P_2O_5$ mol ratio of between about 1.55:1.0 and about 1.95:1.0, this range being exclusive of any calcium oxide content tied up as the calcium salt of the acid employed, such as calcium sulfate. The agglomerate mass, after leaching and reaction, is dried at temperature conditions low enough to maintain the phosphate in the ortho-phosphate state.

Typical aqueous acid solutions which enter into a reaction with dicalcium phosphate are phosphoric acid, sulfuric acid, hydrochloric acid, tartaric acid, and the like, or mixtures thereof. The reaction of the acids other than straight phosphoric acid with dicalcium phosphate results in the formation of binder in situ through the production of phosphoric acid as by reaction between dicalcium phosphate and the acid or through the reaction between added monocalcium phosphate solution and an acid, which in turn reacts to form a calcium phosphate material. Phosphoric acid has the advantage that less acid needs to be added, since phosphoric acid is present for immediate reaction to form a calcium phosphate material, rather than having to form phosphoric acid as an intermediate step. Mixtures of other acidic materials such as $H_3PO_4$ with sulfuric acid has the advantage that it gives control over the $P_2O_5$ content of the final product.

In carrying out this embodiment of the invention it is preferred to mix and react a dicalcium phosphate having a particle size generally such as to pass through an 80 mesh standard screen and a major proportion of which will pass through a 100 mesh standard screen, with an aqueous solution of a free acid. These reactants are thoroughly mixed in proportions to produce a $CaO/P_2O_5$ mol ratio in the final product of between about 1.55:1.0 and about 1.95:1.0, and preferably in the range of between about 1.75:1.0 and about 1.9:1.0. The reacted mixture is then dried, as in a laboratory kiln, at temperatures in the range of from about 90° C. to 120° C.

The reaction between acid and dicalcium phosphate forms monocalcium phosphate, either directly or through the formation of the intermediate free phosphoric acid. Acid solutions react with the dicalcium phosphate in the presence of some moisture. Accordingly, if the commingling or the mixing is sufficiently thorough, the acid solutions may be mixed with wet dicalcium phosphate such as the form in which it is removed from the filter as hereinafter described. Preferably, however, acid solutions are mixed with a water wetted dicalcium phosphate, since this apparently gives a more complete reaction.

The following examples are given as illustrative of this embodiment of the invention. However, the invention is not to be construed as being limited to the details therein set forth.

*Example III*

About 60 tons per hour Florida phosphate rock is ground to a particle size, approximately 52% of which passed through a 200 mesh size standard screen. This rock analyzed approximately 68% B.P.L. The ground rock was mixed with about 36 tons per hour of about 98% sulfuric acid added as approximately 53° Bé. aqueous solution. The mixture was thoroughly agitated for about one minute after which it was discharged onto a continuous belt provided with exhaust means for gases such as sulfur dioxide, silicon tetrafluoride, and the like. The discharge from the belt was stored in a pile for about 30 days.

The stored material was then removed from storage, broken up, and sufficient water added to give a slurry of about 35% undissolved solids. The slurry was subjected to continuously countercurrent leaching and filtering, the final filtrate being a leached solution containing about 30% dissolved solids and being of about 32° Bé. gravity. The discharded tailings contained about 2.5% of the 30% total $P_2O_5$ in the original rock. The filtrate from the leaching operation was further processed by adding approximately 4.7 tons per hour of limestone. After slurrying for approximately 30 minutes the slurry was filtered on a drum filter to remove precipitated solids, such as calcium fluoride, aluminum phosphate, iron phosphate, as well as any unreacted limestone.

The defluorinated extract totaling approximately 136 tons per hour was reacted with additional, approximately 14.7 tons per hour, calcium carbonate to precipitate dicalcium phosphate. The resultant slurry was filtered and the solids dried in a Nichols-Herreschoff multiple hearth furnace at a temperature of about 110° C. The dry dicalcium phosphate was a fine powder substantially 100% of which passed through an 80 mesh size standard screen.

Example IV

Five portions of the dicalcium phosphate material prepared as described in Example III were segregated and treated as follows:

To each sample was added, on a unit weight basis of one hundred parts by weight of dicalcium phosphate, 5%, 7.5%, 10%, 12.5% and 17% by weight, respectively, of sulfuric acid, calculated on a 98% sulfuric acid basis. Each of these samples was fed to a pug mill and the mixing carried on for approximately 10 minutes. The pug mill material was then dried in an oven held at a temperature of approximately 110° C. for 2 hours. Each of the dried samples was then introduced into a ball mill and the materials subjected to the action of approximately one-half inch diameter flint rock balls for 10 minutes. Material was then removed from the ball mill and screened on an 80 mesh size standard screen to determine the proportion of the sample which would pass through the screen. Results were as follows:

| Percent Sulfuric Acid | Percent Passing Through an 80-Mesh Size Screen |
| --- | --- |
| 5 | 42. |
| 7.5 | 29. |
| 10 | 7. |
| 12.5 | 2.5. |
| 17 | Substantially 0. |

Example V

Five portions of the dicalcium phosphate material prepared as described in Example III were segregated and treated as follows:

To each sample was added, on a unit weight basis of one hundred parts by weight of dicalcium phosphate, 8.5%, 12.7%, 17% and 21% by weight, respectively, of phosphoric acid, calculated on a 98% phosphoric acid basis. Each of these samples was fed to a pug mill and the mixing carried on for approximately 10 minutes. The pug mill material was then dried in an oven held at a temperature of approximately 110° C. for about 2 hours. Each of the dried samples was then introduced into a ball mill and the materials subjected to the action of flint rock balls for 10 minutes. Material was then removed from the ball mill and screened on an 80 mesh size standard screen to determine the proportion of the sample which would pass through the screen. Results were as follows:

| Percent Phosphoric Acid | Percent Passing Through an 80 Mesh Size Screen |
| --- | --- |
| 8.5 | 12 |
| 12.7 | 6 |
| 12.7 (double mixed) | [1] 2 |
| 17 | 2.5 |
| 21 | 0.1 |

[1] Prolonged mixing improves results.

Example VI

Five portions of dicalcium phosphate material prepared as described in Example III were segregated and treated as follows:

To each sample was added on a unit weight basis of one hundred parts by weight of dicalcium phosphate, 10 parts by weight, 12.5 parts by weight, and 17 parts by weight, respectively, of a mixture of acids consisting of 10 parts by weight phosphoric acid and 7 parts by weight of sulfuric acid; each of the acids being calculated on a 98% purity acid basis. Each of these samples was fed to a pug mill and the mixing carried on for approximately 10 minutes. The pug mill material was then dried in an oven held at a temperature of approximately 110° C. for approximately 2 hours. Each of the dried samples in turn was then introduced into a bag within a 6 inch diameter ball mill and the material subjected to ball mill action for 10 minutes. The ball mill material was then removed from the ball mill and screened on an 80 mesh size standard screen to determine the proportion of the sample which would pass through the screen. Results were as follows:

| Percent By Weight of Acid Mixture | Percent Passing Through an 80 Mesh Size Screen |
| --- | --- |
| 10 | 8 |
| 12.5 | 4 |
| 17 | 0.5 |

Example VII

Dicalcium phosphate material prepared as described in Example III was treated as follows: Defluorinated extract prepared as described in Example III (a mixture of monocalcium phosphate and phosphoric acid) was heated to 200° F. for one hour and the precipitated solids removed by filtering. The solids-free extract was concentrated from approximately 11% $P_2O_5$ content to approximately 20.8% $P_2O_5$ concentration.

To each approximately 4.4 units by weight of the above dicalcium phosphate material of 47.1% $P_2O_5$ content being agitated in a pug mill was added approximately 0.25 unit by weight of concentrated extract of 20.8% $P_2O_5$, 0.21 unit by weight of 93% sulfuric acid and 0.4 unit by weight of recycled fine product of —80 mesh screen size. The damp mixture from the pug mill was dried in a rotary drier at a temperature of approximately 110° C. where it agglomerates. The dry discharged material from the kiln was screened to remove +14 mesh size and —35 mesh size material. The +14 mesh size material was pulverized in a hammer mill and screened on a 35 mesh screen, the +35 mesh size material being conveyed to product storage. The —35 mesh size material was mixed with the —80 mesh size material from the original product screening and recycled to the pug mill for addition in the proportions described. This fraction of —14 +80 mesh size material is the hard agglomerated product of commerce.

C. THE REACTION OF DICALCIUM PHOSPHATE WITH AQUEOUS SOLUTION OF ACID SALTS

In accordance with this embodiment of the invention dicalcium phosphate such as that prepared by leaching acidulated phosphate rock and precipitation with limestone or calcium hydroxide is reacted with an aqueous solution of an acid salt capable of forming sufficient hydrogen ions in solution to react with the dicalcium phosphate and form an agglomerate containing the desired amount of monocalcium phosphate. Here, as in the previously described embodiments of the invention, the proportions of the reactants are controlled to produce an agglomerate characterized by a $CaO/P_2O_5$ mol ratio of between about 1.55:1.0 and about 1.95:1.0, and preferably of between about 1.75:1.0 and about 1.9:1.0. The preferred acid salt to be employed in accordance with this embodiment of the invention is sodium dihydrogen ortho-phosphate. However, other acid salts such as potassium dihydrogen phosphate, sodium acid sulfate, potassium acid sulfate, or the like, or mixtures thereof, also may be employed in this embodiment of the invention. Acid phosphate salts are preferred for the same reasons as above set forth with respect to the preference of phosphoric acid in the embodiment of the invention wherein an aqueous solution of a free acid is reacted with dicalcium phosphate to produce the granular agglomerates of the invention. The acid salt of hydrofluoric acid is of course undesirable due to its introduction of fluorine into the product.

The following example is given specifically to illustrate the embodiment of the invention wherein an aqueous solution of an acid salt is reacted with dicalcium phosphate, it being understood that this example is presented for illustrative purposes and not as limiting the scope of the invention.

Example VIII

One hundred parts by weight of dicalcium phosphate prepared as in Example III are mixed with an amount of concentrated aqueous solution of sodium dihydrogen ortho-phosphate sufficient to produce a final mixture of monocalcium and dicalcium phosphate characterized by a $CaO/P_2O_5$ mol ratio of about 1.85:1.0. The mixture is agitated in a pug mill and then dried in an oven at a temperature of about 110° C. The dried material is then introduced into a ball mill and milled with flint rock balls for 10 minutes. Eighty-five percent of the resulting granular agglomerate is held on an 80 mesh screen.

This application is a continuation-in-part of applications Serial No. 437,649 and Serial No. 437,858, both filed June 18, 1954, and both now abandoned, the disclosures of said applications being herein incorporated by this reference.

Having thus described the invention, what is claimed is:

1. A granular, substantially fluorine-free, animal feed grade dicalcium phosphate product comprising a substantially non-hygroscopic agglomerate of a plurality of particles of dicalcium phosphate, said particles being substantially enveloped in and bonded together with a matrix containing as a bonding agent monocalcium phosphate, the calcium oxide to phosphorus pentoxide mol ratio of the mono- and dicalcium phosphate materials in said agglomerate being within the range of about 1.55:1.0 to about 1.95:1.0, said monocalcium phosphate comprising a minor proportion of the product and said product being substantially free from iron and aluminum impurities.

2. A granular dicalcium phosphate product as defined in claim 1 wherein the particles of dicalcium phosphate are substantially fluorine free.

3. A granular dicalcium phosphate product as defined in claim 1 wherein the calcium oxide to phosphorus pentoxide mol ratio of the calcium phosphate materials only is within the range of from about 1.75:1.0 and about 1.9:1.0.

4. The process which comprises mixing particulate, substantialy fluorine-free dicalcium phosphate with an aqueous solution of a water soluble calcium phosphate comprising monocalcium phosphate, both the said dicalcium and monocalcium phosphate being substantially free from iron and aluminum impurities, agitating and drying the mixture to produce a granular dicalcium phosphate product in the form of a substantially non-hydroscopic agglomerate of a plurality of particles of dicalcium phosphate, said particles being substantially enveloped in and bonded together with a matrix containing as a bonding agent monocalcium phosphate, the proportions of said dicalcium phosphate and said aqueous solution being such that in the agglomerate so produced the calcium oxide to phosphorus pentoxide mol ratio of the mono- and dicalcium phosphate materials is within the range of about 1.55:1.0 to 1.95:1.0, said monocalcium phosphate comprising a minor proportion of the product.

5. The process of claim 4 wherein the aqueous solution of the calcium phosphate is characterized by a calcium oxide to phosphorus pentoxide mol ratio of between about 0.2:1.0 and about 1.0:1.0.

6. The process of claim 4 wherein said aqueous solution of calcium phosphate is employed in proportions requisite to produce in the final agglomerate a calcium oxide to phosphorus pentoxide mol ratio of calcium phosphate materials only within the range of from about 1.75:1.0 and about 1.9:1.0.

7. The process of claim 4 wherein said mixture is dried at a temperature of from about 90° C. to about 120° C.

8. The process of claim 4 wherein said particulate dicalcium phosphate has a particle size of less than about 80 mesh.

9. The process of claim 4 wherein the aqueous solution of calcium phosphate is an aqueous extract of acidulated phosphate rock.

10. The process of claim 9 wherein said aqueous extract is substantially defluorinated.

11. The process of claim 10 wherein said aqueous extract is defluorinated by reaction with a calcium oxide bearing reactant followed by removal of the fluorine-rich precipitate so formed.

12. The process of claim 9 wherein said extract is concentrated prior to admixture with said particulate dicalcium phosphate.

13. The process which comprises reacting particulate, substantially fluorine-free dicalcium phosphate substantially free from iron and aluminum impurities with between about 2% and about 21% based on the weight of dicalcium phosphate of an acid selected from the group consisting of phosphoric acid, sulfuric acid, hydrochloric acid, and mixtures thereof, calculated as 98% concentration, agitating and drying the reaction mixture to produce a granular dicalcium phosphate product comprising a substantially non-hygroscopic agglomerate of a plurality of particles of dicalcium phosphate, said particles being substantially enveloped in and bonded together with a matrix containing as a bonding agent monocalcium phosphate, the calcium oxide to phosphorus pentoxide mol ratio of the mono- and dicalcium phosphate materials in said agglomerate being within the range of about 1.55:1.0 and about 1.95:1.0, said monocalcium phosphate comprising a minor proportion of the product.

14. The process of claim 13 wherein said acid is sulfuric acid.

15. The process of claim 14 wherein said sulfuric acid, calculated as 98% sulfuric acid, is employed in an amount between about 12.5% and about 17.5% by weight based on said dicalcium phosphate.

16. The process of claim 14 wherein said acid with which said particulate dicalcium phosphate is reacted is phosphoric acid.

17. The process of claim 16 wherein said phosphoric acid, calculated as 98% phosphoric acid, is employed in an amount between about 12.7% and about 21% by weight based on said particulate dicalcium phosphate.

18. The process of claim 14 wherein said acid with which said particulate dicalcium phosphate is reacted is hydrochloric acid.

19. The process of claim 14 wherein said acid with which said particulate dicalcium phosphate is reacted is a mixture of phosphoric acid and sulfuric acid.

20. The process of claim 19 wherein said mixture of phosphoric acid and sulfuric acid is employed in an amount between about 12.5% and about 17% by weight based on said dicalcium phosphate when said acids are calculated as 98% acids.

21. The process of claim 14 wherein said reaction mixture is dried at a temperature of between about 90° C. and about 120° C.

References Cited in the file of this patent

UNITED STATES PATENTS

| Number | Name | Date |
|---|---|---|
| 417,820 | Glaser | Dec. 24, 1889 |
| 418,259 | Winssinger | Dec. 31, 1899 |
| 1,375,115 | Shoeld | Apr. 19, 1921 |
| 1,461,077 | Webster | July 10, 1923 |
| 2,013,970 | Moore | Sept. 10, 1935 |
| 2,018,449 | Knox | Oct. 22, 1935 |
| 2,053,266 | Curtis | Sept. 8, 1936 |
| 2,062,064 | Knox | Nov. 24, 1936 |
| 2,176,464 | Merchant | Oct. 17, 1939 |
| 2,567,227 | Miller | Sept. 11, 1951 |
| 2,722,472 | Le Baron | Nov. 1, 1955 |
| 2,728,635 | Miller | Dec. 27, 1955 |

FOREIGN PATENTS

| Number | Country | Date |
|---|---|---|
| 391,495 | Great Britain | May 1, 1933 |